(12) United States Patent
Jerger et al.

(10) Patent No.: US 10,731,749 B2
(45) Date of Patent: Aug. 4, 2020

(54) INPUT DEVICE FOR A VEHICLE CONTROL SYSTEM

(71) Applicant: Jaguar Land Rover Limited, Whitley, Coventry, Warwickshire (GB)

(72) Inventors: Rob Jerger, Southam Stockton (GB); James Gennard, Pedmore Stourbridge (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 569 days.

(21) Appl. No.: 15/029,332

(22) PCT Filed: Oct. 14, 2014

(86) PCT No.: PCT/EP2014/072014
§ 371 (c)(1),
(2) Date: Apr. 14, 2016

(87) PCT Pub. No.: WO2015/055649
PCT Pub. Date: Apr. 23, 2015

(65) Prior Publication Data
US 2016/0265654 A1    Sep. 15, 2016

(30) Foreign Application Priority Data
Oct. 14, 2013   (GB) .................................. 1318094.8

(51) Int. Cl.
*F16H 59/12*   (2006.01)
*F16H 59/02*   (2006.01)
*B62D 1/04*    (2006.01)

(52) U.S. Cl.
CPC ......... *F16H 59/0204* (2013.01); *B62D 1/046* (2013.01); *F16H 2059/0243* (2013.01); *F16H 2059/0247* (2013.01)

(58) Field of Classification Search
CPC ......... F16H 59/0204; F16H 2059/0247; F16H 2059/0243; F16H 2059/0221; F16H 2059/082; B62D 1/046
(Continued)

(56) References Cited

U.S. PATENT DOCUMENTS 2,729,116 A   1/1952  Arnold
5,617,929 A   4/1997  Richardson et al.
(Continued)

FOREIGN PATENT DOCUMENTS

DE   102006006995 A1 *  8/2007  ............... B62D 1/04
DE   102006006995 A1    8/2007
(Continued)

OTHER PUBLICATIONS

English translation of FR 2972686 (Year: 2011).*
(Continued)

*Primary Examiner* — Randell J Krug
(74) *Attorney, Agent, or Firm* — Reising Ethington P.C.

(57) ABSTRACT

An input device for use in a vehicle steering assembly. The input device includes at least one user-operable control member which is moveable between a deployed state and a retracted state. When a control member is in its deployed state it is operable to provide an input to a vehicle control system, and when retracted, it is moved to a position that avoids accidental actuation. In a particular example, the or each control member is a paddle shaped lever which is used to send gear change requests to an automatic transmission, and the lever is retracted when gear change requests do not need to be sent.

19 Claims, 7 Drawing Sheets

(58) Field of Classification Search
USPC .................. 74/484 R, 553, 473.3, 473.18
See application file for complete search history.

(56) References Cited

U.S. PATENT DOCUMENTS

| | | | | |
|---|---|---|---|---|
| 7,278,510 | B1 * | 10/2007 | Richards | B62D 1/046 |
| | | | | 180/336 |
| 7,458,562 | B1 * | 12/2008 | Chen | B88F 3/10 |
| | | | | 254/103 |
| 7,845,457 | B2 * | 12/2010 | Baluch | B60K 20/06 |
| | | | | 180/334 |
| 8,227,945 | B2 * | 7/2012 | Gibas | F16H 25/24 |
| | | | | 310/20 |
| 2009/0218160 | A1 | 9/2009 | Baluch et al. | |
| 2010/0032266 | A1 | 2/2010 | Stephan | |
| 2011/0232408 | A1 * | 9/2011 | Rampf | B60K 20/06 |
| | | | | 74/473.3 |

FOREIGN PATENT DOCUMENTS

| | | | |
|---|---|---|---|
| DE | 102008059417 A1 | 6/2010 | |
| DE | 102012010680 B3 | 9/2013 | |
| EP | 1283146 A2 | 2/2003 | |
| FR | 2972686 A1 * | 9/2012 | ............ B60K 20/06 |
| FR | 2972686 A1 | 9/2012 | |

OTHER PUBLICATIONS

Combined Search and Examination Report corresponding to application No. GB1318094.8, dated Jun. 2, 2014, 7 pages.
International Search Report corresponding to International Application No. PCT/EP2014/072014, dated Jan. 15, 2015, 4 pages.
Written Opinion corresponding to International Application No. PCT/EP2014/072014, dated Jan. 15, 2015, 6 pages.

* cited by examiner

INPUT DEVICE FOR A VEHICLE CONTROL SYSTEM

FIELD OF THE INVENTION

This invention relates to an input device for a vehicle control system. In particular, but not exclusively, the invention relates to an input device for a gearshift system for a vehicle steering assembly. Aspects of the invention relate to an input device, a vehicle steering assembly, an automatic transmission, a control system, a method, and a vehicle.

BACKGROUND

Some vehicles incorporate a fully automatic transmission in which gear selections are performed without user input. For this purpose, a transmission controller is provided which determines when gear changes should be made and then implements automatic upshifts and downshifts accordingly. Typically, gear changes are made automatically in accordance with a set of control regimes which correspond to user-selectable modes of operation. For example, there may be a "normal" or "drive" mode, in which gear upshifts are effected at relatively low engine speeds so as to provide efficient operation, and a "sport" mode, in which upshifts are effected at higher engine speeds for enhanced acceleration. More advanced vehicles may include several further modes of operation relating to a range of different driving conditions that the vehicle may encounter.

Many electronically controlled transmissions offer the option for a driver to manually request a gear change by operating an input device. The input device generates a request signal for an upshift or a downshift which is sent to the transmission controller, which implements the requested gear change within prescribed limits. For example, a request to downshift will not be implemented if the projected engine speed is too high in the proposed target gear, and an automatic downshift may be implemented to avoid an engine stall, but otherwise the transmission is held in the gear selected by the driver.

One known example of an input device for manual gearshift control is a paddle gearshift selector system, in which two paddle-shaped levers are provided on diametrically-opposite sides of a steering wheel. Each lever acts as an input device, and is operable to close a microswitch to trigger a gear change event. The levers are typically positioned behind the steering wheel in such a way that enables a driver of the vehicle to operate the levers with their fingers whilst simultaneously gripping the steering wheel, allowing the driver to select gears without taking a hand off the steering wheel.

The gearshift selector system forms part of a steering assembly which includes a steering column housing and the steering wheel, along with various other controls such as indicator stalks and cruise control activators. In these arrangements, the levers are either mounted directly to the steering wheel, or to the steering wheel column housing immediately behind the steering wheel. Typically, one lever is operable to shift up a gear, and the other lever is operable to shift down a gear, and the appropriate lever is pulled towards the driver to request the shift. In another arrangement, either one of the levers can be pulled towards the driver to change up a gear or pushed away from the driver to change down a gear.

In one type of system, when a lever is operated, the transmission switches into a temporary manual-selection mode, in which normal automatic gear changes are suspended and control of the gear selection passes to the driver. Automatic control may be resumed after a pre-determined period if no further manual gear change inputs are made by the driver.

One drawback to paddle gearshift selector systems is that, because of the intentional close proximity of the paddles to the steering wheel, the driver's hands can inadvertently trigger a gearshift, or accidentally set the transmission into the manual gear selection mode, whilst performing steering operations. This is particularly the case for operations in which the steering wheel needs to be manipulated rapidly, for example when undertaking complex maneuvers such as parking. In addition, if the steering wheel is turned by around 90° it is possible for the paddles to foul the driver's legs or clothing, which could also trigger an unintentional gearshift or an unexpected switch into manual gear selection mode.

Against this background, it would be desirable to provide an improved input device for a gearshift system for use in a vehicle, which overcomes or at least substantially alleviates the disadvantages known in the prior art.

SUMMARY OF THE INVENTION

According to an aspect of the invention there is provided an input device for use in a vehicle steering assembly, the input device comprising at least one user-operable control member which is moveable between a deployed state and a retracted state. When the control member is in its deployed state, the control member is operable to provide an input to a vehicle control system.

Conveniently, by providing the ability to move the control member into a retracted state, the control member can be moved out of the way of the user's hands when an input is not required. In this way, accidental triggering of an input can be avoided. Without retraction, even if the (or each) control member were to be disabled, if the driver accidentally operates a control member whilst steering, they may be uncertain of whether there has been an input. Therefore, the invention in at least some embodiments provides an improved driving experience by avoiding this scenario.

The control member may be operable, in use, to output a gearshift request signal for a vehicle transmission system. Thus, the risk of an unintended gearshift request, for example caused by accidental triggering of the control member by a user whilst steering, may be reduced by virtue of movement of the control member into the retracted state.

The input device may comprise positioning means for moving the control member between the deployed state and the retracted state. The positioning means may comprise an electric motor, which in one embodiment is operable to effect rotation of a screw, such that rotation of the screw causes the control member to move between the retracted state and the deployed state. In another embodiment, the motor drives a cam to effect movement of the control member.

The input device may comprise a switch that is operable by the control member when the control member is in the deployed state. Said switch can be used to generate electrical input signals. The switch may be operable by the control member when in the retracted state, which enables manual deployment of the control member.

The control member may comprise a lever, which is a convenient arrangement for user interaction.

According to another aspect of the invention, there is provided a vehicle steering assembly, comprising a steering wheel and an input device as described above.

In the vehicle steering assembly the control member may be mounted to the steering wheel, in which case the control member may be pivotally mounted to the steering wheel at a pivot. The control member may be mounted directly onto the steering wheel. Alternatively, the control member may be mounted to an intermediate component which acts as a carrier, in which case the carrier is in turn mounted directly to the steering wheel. The intermediate member may be pivotally mounted to the steering wheel.

In the embodiments where the control member is mounted to the steering wheel, a free end of the control member is disposed towards a rim of the steering wheel and remote from the pivot. Advantageously, when in its deployed state, the free end of the control member may be positioned with respect to the rim of the steering wheel such that the control member can be operated by a user with one hand whilst simultaneously gripping the steering wheel with the same hand.

When in its retracted state, the free end of the control member may be closer to the steering wheel than when the control member is in its deployed state. This beneficially places the control member in a position in which accidental user operation is unlikely. In another embodiment, for enhanced protection against accidental operation, when in its retracted state, the control member may be stowed in a recess provided in the steering wheel.

According to another aspect of the invention, there is provided a transmission for a vehicle, comprising a transmission controller and an input device or a vehicle steering assembly as described above. In this aspect, the control member of the input device is operable to provide a gearshift request input to the transmission controller.

In an embodiment, when the control member is in its retracted state, the transmission controller is arranged to ignore gearshift request inputs sent by the control member. This conveniently prevents accidental triggering of a gear change or of a manual gear selection mode.

Movement of the control member between the deployed and retracted states may be controlled by the transmission controller.

The transmission may comprise first and second control members disposed on opposite sides of the vehicle steering assembly. This offers a convenient arrangement for user interaction. In such arrangements, the transmission may be configured such that movement of the first and second control members from the deployed state into the retracted state can be triggered by operating the first and second control members simultaneously. This provides a level of user control over deployment of the control members, therefore increasing flexibility of the transmission.

The first control member may be operable to send an upshift request to the transmission controller, and the second controller may be operable to send a downshift request to the transmission controller.

According to another aspect of the invention, there is provided a method for operating an input device for a vehicle transmission, the input device comprising at least one control member associated with a vehicle steering assembly, the method comprising moving the control member into a deployed state in which the control member is accessible by the user, and/or moving the input device into a retracted state.

The method may comprise monitoring an operating parameter of the vehicle, and moving the control member into the retracted state or the deployed state in dependence on the operating parameter. The operating parameter may be a vehicle speed, in which case the method comprises moving the control member into the retracted state if the vehicle speed is below a speed threshold.

Alternatively, the operating parameter may be a steering wheel angle, in which case the method comprises moving the control member into the retracted state if the steering wheel angle is above an angle threshold. As a further alternative, the operating parameter may be a rate of change of steering wheel angle. In this case the method comprises moving the control member into the retracted state if the rate of change is above a rate threshold.

The operating parameter may be a terrain mode, in which case the method comprises moving the control member into the deployed state if the vehicle is in an off-road driving mode.

The operating parameter may be a vehicle gear, in which case the method comprises moving the control member into the retracted state if the vehicle is operating in a pre-determined low range gear. Alternatively, or in addition, when the operating parameter is a vehicle gear, the method may comprise moving the control member into the retracted state if the vehicle is operating in reverse gear.

The operating parameter may be a vehicle drive mode. In this embodiment, the method comprises moving the control member into the retracted state if the drive mode in which the vehicle is operating is a pre-determined drive mode.

The method may comprise moving the control member into its retracted state if the control member is not operated for a pre-determined time period. This advantageously ensures the user does not accidentally trigger the control member when it is not in use.

The method may comprise detecting a user request for deployment or retraction of the control member, and moving the control member into a retracted state or a deployed state in response to the user request. This enables manual control of deployment and retraction of the control member, which provides enhanced flexibility for the user. The user request for deployment or retraction may comprise a user input to the or each control member.

According to another aspect of the invention, there is provided a vehicle comprising an input device, a vehicle steering assembly, or a transmission as described above.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, except where such features are incompatible.

BRIEF DESCRIPTION OF DRAWINGS

Embodiments of the present invention will now be described, by way of example only, with reference to the accompanying drawings, in which like components are assigned like numerals, and in which.

DETAILED DESCRIPTION

Figure 1:
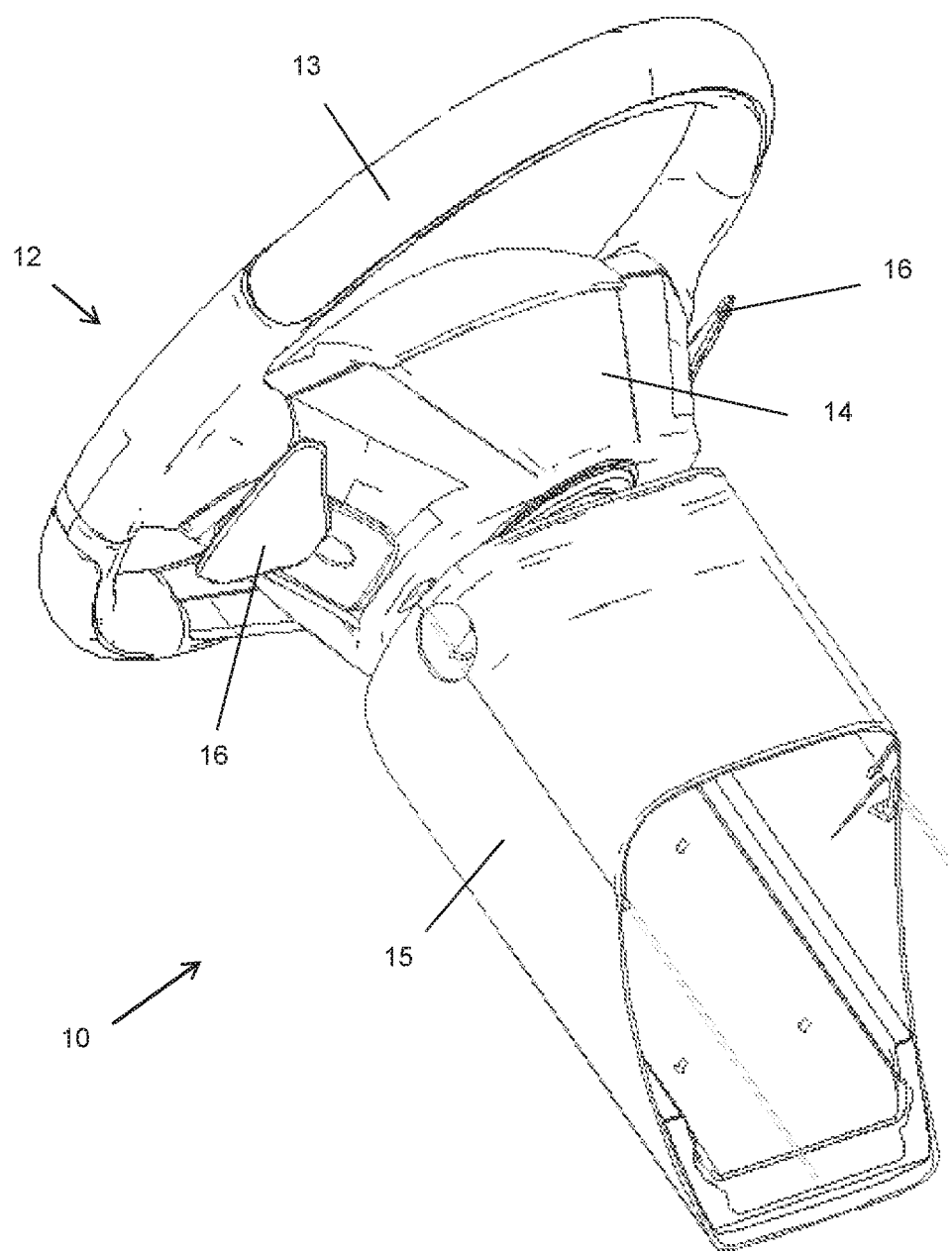
FIG. 1 is a perspective view of a vehicle steering assembly including a conventional paddle gearshift selector system mounted to a vehicle steering wheel, as seen from an elevated position.

FIG. 1 illustrates a known vehicle steering assembly 10 which includes a steering wheel 12 having a rim 13 and a central hub 14, a steering column housing 15 and a pair of paddles 16 disposed on either side of the steering wheel 12. The paddles 16 form part of a conventional paddle gearshift selector system arranged to cooperate with an automatic transmission. The paddles 16 are pivotably mounted to the side of the steering wheel 12 that faces away from the driver, in order to act as levers for actuating microswitches (not shown). When actuated, the microswitches generate a gear change request signal output which is received by a controller of the automatic transmission (referred to hereafter as a transmission controller) in order to trigger a gear change. The paddles 16 are mounted such that they pivot about an axis that is substantially vertical when the steering wheel 12 is in a straight-ahead position. Typically, the paddles 16 can be pulled towards the steering wheel rim 13 in order to actuate the microswitch. A respective return mechanism (not shown), for example a spring, is provided for each paddle 16. The return mechanism biases the respective paddle 16 away from the steering wheel rim 13, to return the paddle 16 to a rest position when released.

A manual gear change is effected by pulling a paddle 16 away from its rest position into an activation position. Once released, the paddle 16 returns to the rest position under the action of the return mechanism. The paddles 16 are typically positioned so as to be within easy reach of the steering wheel rim 13, such that a driver can operate a paddle 16 with their fingers whilst still gripping the steering wheel rim 13.

When a paddle 16 is pulled towards the steering wheel rim 13 into its activation position, a gear change request signal is generated by the respective microswitch. The gear change request signal is received by the transmission controller to indicate that a manual gear change has been requested. The automatic transmission then changes the operating gear accordingly, so long as the request falls within prescribed operating limits.

The arrangement is configured so that one paddle 16 is used to request an upshift when pulled, and correspondingly the other paddle 16 is used to request a downshift when pulled. If neither paddle 16 is pulled for a specified period, for example one minute, the manual mode is deactivated and automatic gear shifting is resumed.

In this conventional arrangement, the system is typically configured such that, by default, the transmission operates in an automatic mode. The transmission can be switched into a manual gear selection mode by generating a gear change request signal by pulling one of the paddles 16 towards the steering wheel 12. When the manual gear selection mode is activated, the transmission controller temporarily suspends automatic gear changes, and instead implements gear changes according to requests generated as the driver operates the paddles 16.

Since the paddles 16 are mounted to the steering wheel 12, the paddles 16 move with the steering wheel 12 as it rotates. This can lead to the above-described problem of inadvertent manual gear selection or accidental triggering of manual gear selection mode.

Figure 2:
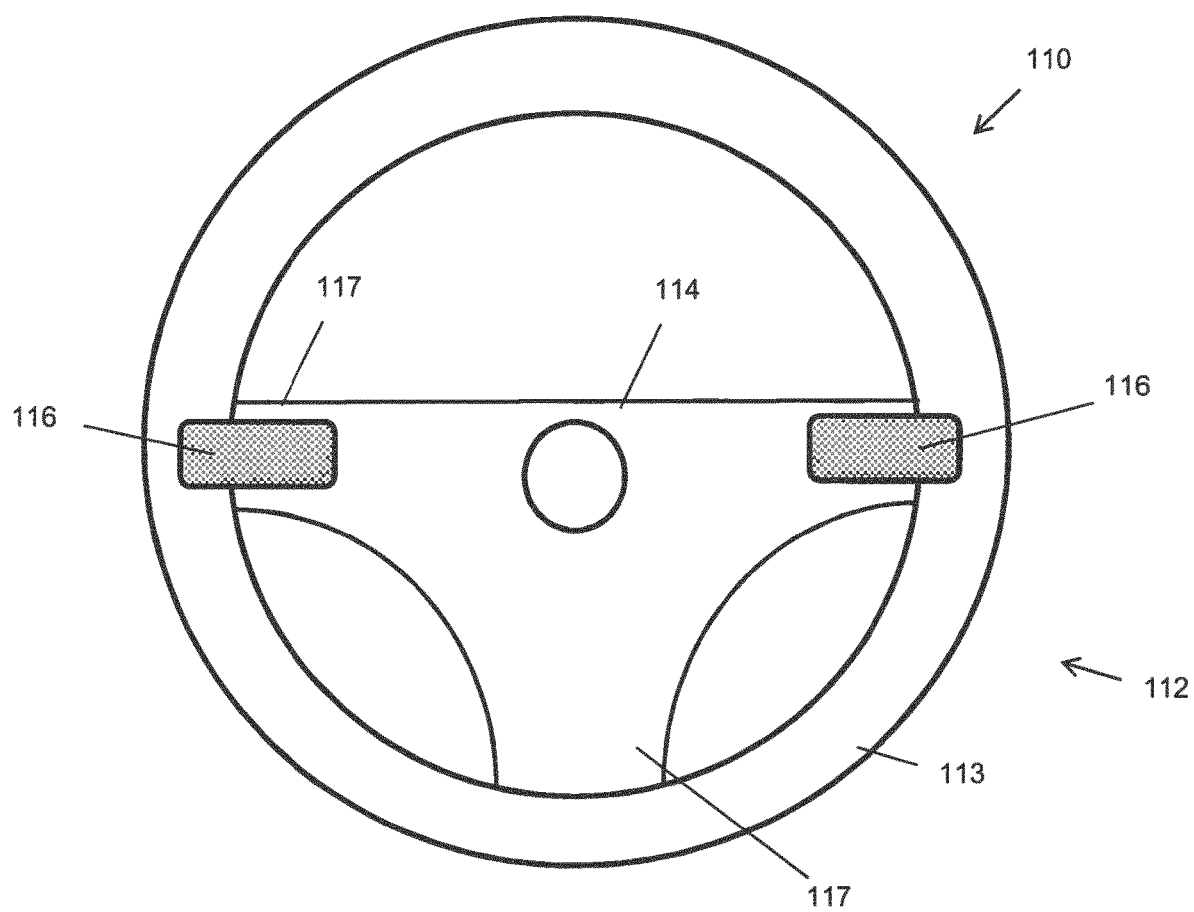
FIG. 2 is a schematic view of a vehicle steering assembly including a paddle gearshift selector system according to an embodiment of the invention.
Figure 3:
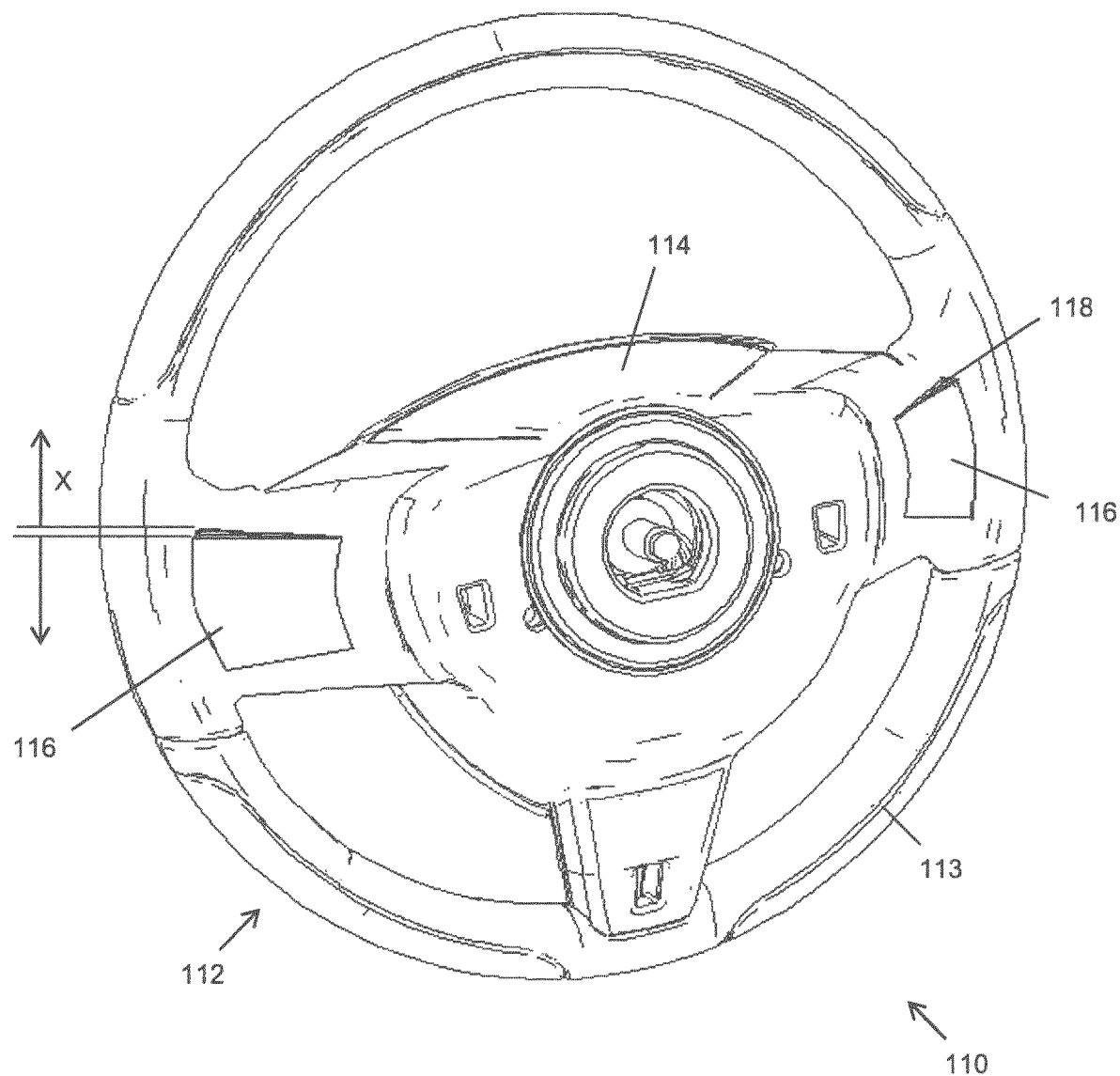
FIG. 3 is a perspective view of the vehicle steering assembly of FIG. 2 with gearshift paddles of the paddle gearshift selector system in a deployed state.
Figure 4:
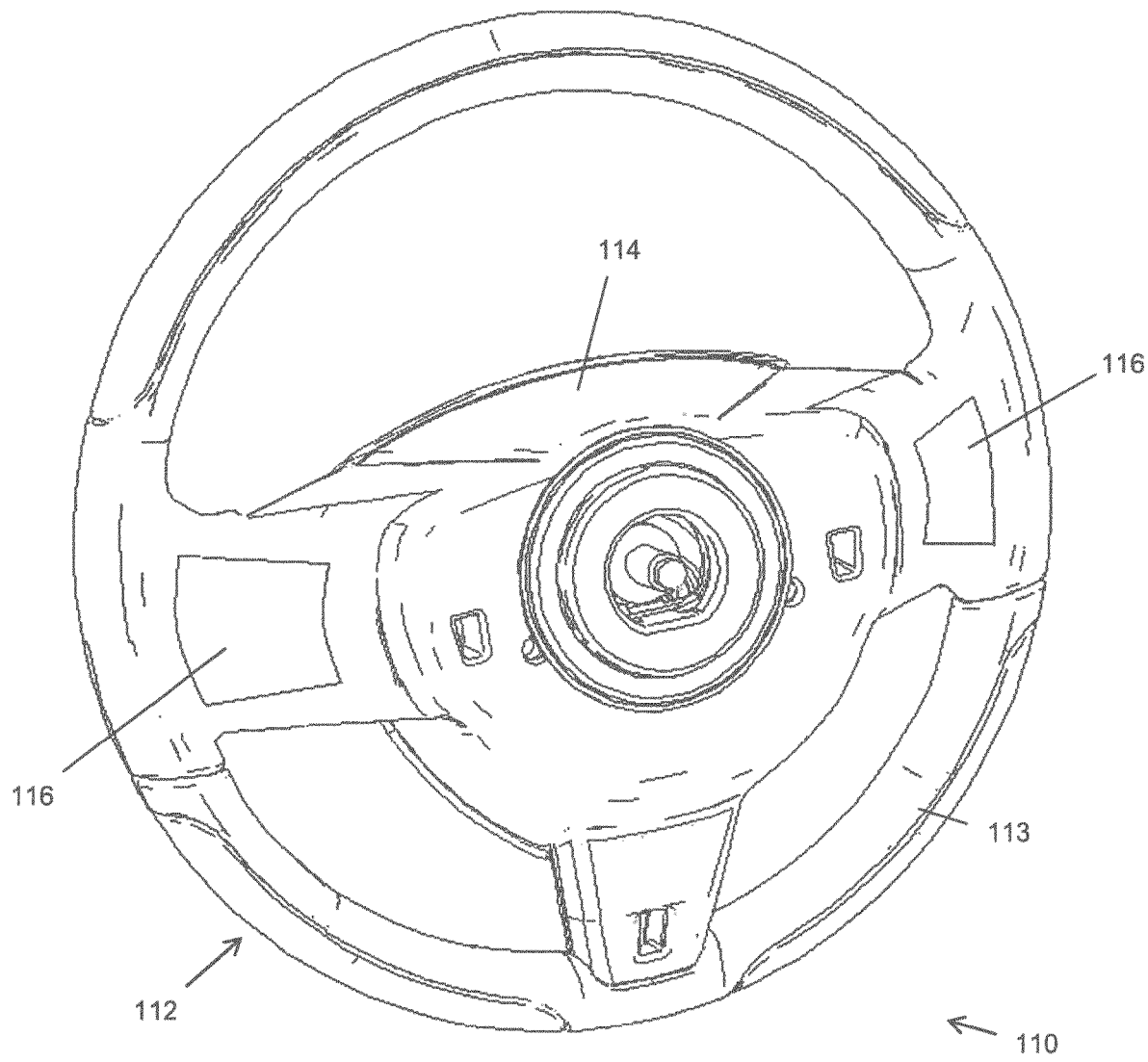
FIG. 4 is a perspective view of the vehicle steering assembly of FIG. 2 with the gearshift paddles in a retracted state.

FIGS. 2 to 4 illustrate a vehicle steering assembly 110 according to an embodiment of the invention. The steering assembly 110 includes a steering wheel 112 having a steering wheel rim 113 and a central hub 114. The steering wheel rim 113 and the central hub 114 are connected by a plurality of spokes 117 extending therebetween. In this case, three spokes are present: two on either side of the hub 114 that extend generally horizontally when the steering wheel 112 is in a straight-ahead position, and one at the lower edge of the hub 114.

A pair of control members in the form of retractable paddles 116 are disposed on either side of the steering wheel 112. Each paddle 116 is disposed on a respective side spoke 117 of the steering wheel 112. An inner end of each paddle 116 is pivotally mounted to the spoke 117.

Each paddle 116 is movable between a deployed position and a retracted position. The paddles 116 can be moved into the retracted position when manual gear selection is not required, so that the paddles are stowed out of the way of the driver's hands. A paddle position sensor (not shown) is provided to detect whether a paddle 116 is in its retracted or deployed state. An output from the sensor is relayed to the transmission controller, so that the transmission controller knows what position the 116 paddles are in at all times.

FIG. 3 illustrates the open or deployed position, in which the paddles 116 are oriented such that an outer end of each paddle 116 nearest the steering wheel rim 113 is displaced from the steering wheel rim 113 by a distance denoted by the opposing arrows X in the figure. The outer end of each paddle 116 is free to be pulled towards the driver. When the paddles 116 are deployed, the outer end of each paddle 116 extends into a space immediately behind the steering wheel rim, such that the driver can operate a paddle 116 with their fingers whilst gripping the steering wheel rim with the same hand.

When the paddles 116 are pulled, they move from a rest position to an activation position to actuate a respective microswitch (not shown in FIGS. 2 to 4). Each microswitch generates an electronic gear change request signal when actuated, for example by the closure of a normally-open circuit. The signal is sent to the transmission controller in order to trigger a gear change and also to trigger a manual mode. A return mechanism (not shown) is provided to bias each paddle 116 away from the steering wheel 112 and into its rest position when the driver releases the paddle 116.

As best illustrated in FIG. 3, the side spokes 117 of the steering wheel 112 include recesses 118 in which the paddles 116 are received when they are in the retracted state.

FIG. 4 illustrates the paddles 116 in a retracted state. When the paddles 116 are in the retracted state they are stowed in the recesses 118, such that they are substantially flush with the surface of the steering wheel spokes 117 on which they are mounted. Therefore, the paddles 116 are moved into a position in which the driver is unlikely to pull them accidentally, thereby inadvertently triggering a gear change request signal.

In this way, the paddles 116 can be moved out of the way of the driver's hands when they are not in use, therefore preventing inadvertent gear changes or triggering of manual gear selection mode when the paddles 116 are in the retracted state. When manual gear selection is desired or anticipated, the paddles 116 are moved into the deployed state. Movement of the paddles 116 between the deployed and retracted states can be triggered on demand from the driver, or in response to changes in vehicle operating conditions, as described in more detail below.

Figure 5:
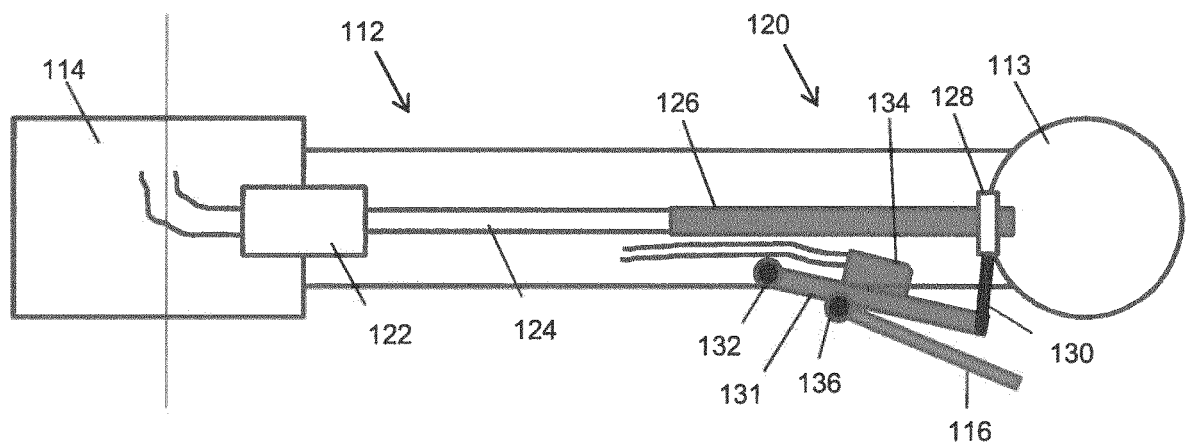
FIG. 5 is a schematic cross-sectional view of part of the vehicle steering assembly of FIGS. 2 to 4 with the gearshift paddles in the deployed state.
Figure 6:
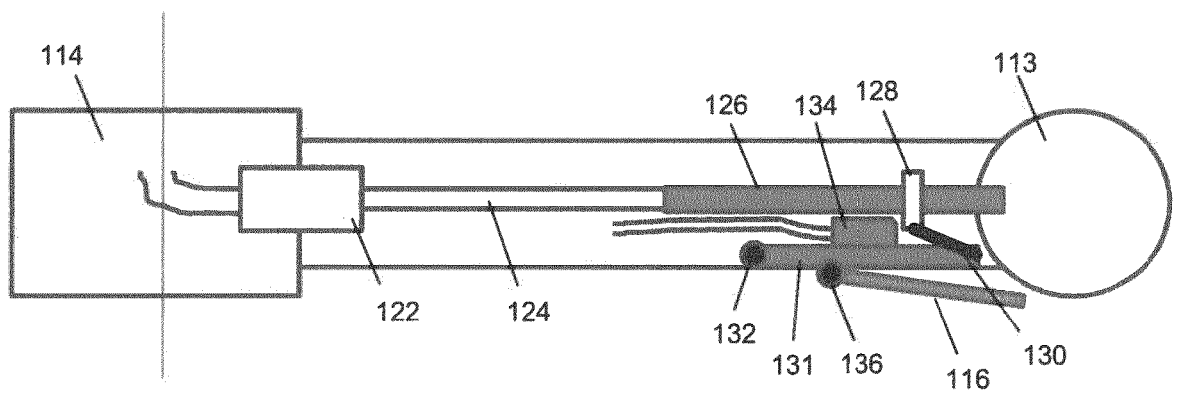
FIG. 6 is a schematic cross-sectional view of part of the vehicle steering assembly of FIGS. 2 to 4 with the gearshift paddles in the retracted state.

FIGS. 5 and 6 show simplified cross-sectional views of the steering wheel 112. A paddle deployment and retraction mechanism 120 is provided to move the paddles 116 between the retracted state and the deployed state.

FIGS. 5 and 6 show one side of the steering wheel 112, with a positioning means in the form of a deployment/retraction mechanism 120 installed into a steering wheel side spoke 117. A paddle 116 and a portion of the steering wheel 112 are also visible in cross-section, including the steering wheel rim 113 and part of the central hub 114.

The mechanism 120 includes an electric motor 122 which is housed in the central hub 114, and which is controlled by the transmission controller. The motor 122 drives a lead screw 124 which includes a threaded portion 126 at an end remote from the motor 122. A nut 128 is received on the threaded portion 126 of the lead screw 124. The nut 128 is coupled by way of a linkage 130 to a carrier 131 on which the paddle 116 is pivotally mounted. The linkage prevents rotation of the nut 128. Therefore, when the motor 122 drives the lead screw 124, the nut 128 moves linearly back and forth (left to right in FIGS. 5 and 6) on the threaded portion 126, with the direction of movement of the nut 128 depending on the sense of rotation of the lead screw 124.

The carrier 131 is pivotally attached to the steering wheel 112 at a pivot 132. When the nut 128 moves, the linkage 130 causes movement of the carrier 131 about the pivot 132. When the nut 128 moves away from the motor 122, the linkage 130 pushes the outer end of the carrier 131 towards the deployed state, as illustrated in FIG. 5. When the nut 128 moves towards the motor 122, the linkage 130 pulls the outer end of the carrier 131 towards the retracted state, as illustrated in FIG. 6. The paddle 116 moves with the carrier 131, and accordingly the motor 122 is operable to move the paddle 116 between the deployed state and the retracted state. When the lead screw 124 is not driven by the motor 122, the carrier 131 is held stationary, but the paddle 116 is free to pivot on the carrier 131 at all times.

A microswitch 134 is attached to the carrier 131. The paddle 116 is mounted at a paddle pivot 136, and is operably connected to the microswitch 134 by way of a lever (not shown). Movement of the paddle 116 about the paddle pivot 136 actuates movement of the lever which generates an electrical signal in the microswitch 134. Therefore, when in the deployed state, if the paddle 116 is pulled by the driver, the movement of the paddle 116 causes the microswitch 134 to generate a gear change request signal indicating that the paddle 116 has been pulled, which is sent to the transmission controller.

The power supplied to the motor 122 by the transmission controller is monitored, as a spike in demand indicates resistance to movement of the carrier 131 and the paddle 116. This may indicate that a driver's finger has become trapped between the paddle 116 or the carrier 131 and the steering wheel 112, in which case the transmission controller reverses the output of the motor 122 in order to release the finger. In addition, a sliding finger guard (not shown) could be provided. The guard is driven by a suitable mechanism to deploy while a carrier 131 and paddle 116 are moving from the deployed position to the retracted position, in order to prevent a driver inserting a finger into the gap between a carrier 131 or a paddle 116 and the steering wheel 112 while the paddle 116 and carrier 131 are moving into the retracted state. Once the carrier 131 has completed its movement, the finger guard can then be stowed.

The paddles 116, the microswitches and the positioning means together define an input device which is arranged to offer the driver the ability to manually request gear changes when the paddles are in a deployed state, and to retract the paddles out of the driver's way when manual gear change requests are not required.

Figure 7:
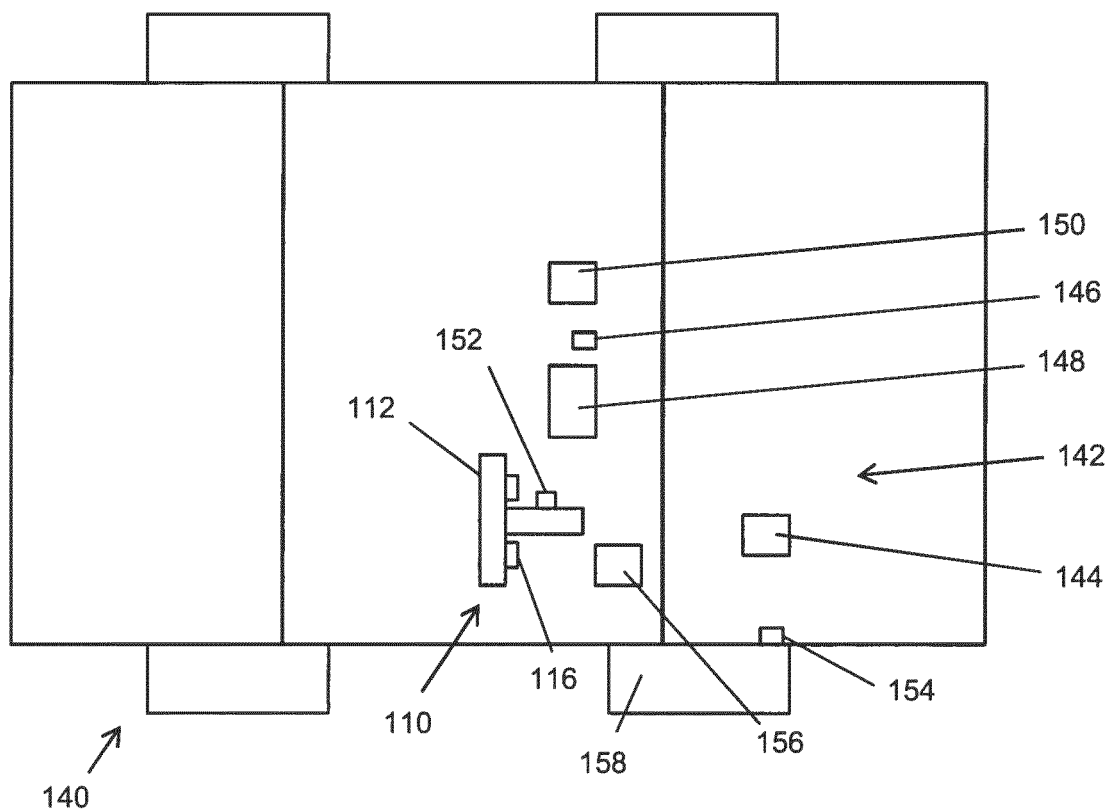
FIG. 7 is a schematic diagram showing the components of the vehicle that are involved in operating the paddle gearshift selector system of FIG. 2.

FIG. 7 shows a vehicle 140 including a gearshift system 142 arranged to operate in conjunction with the vehicle steering assembly 110 of FIGS. 2 to 4. The gearshift system 142 includes a transmission controller 144, a transfer box controller 146, a human-machine interface (HMI) 148, and a terrain mode controller 150. The gearshift system 142 also receives input data from a steering angle sensor 152, a wheel speed sensor 154, and a braking system controller 156.

Figure 8:
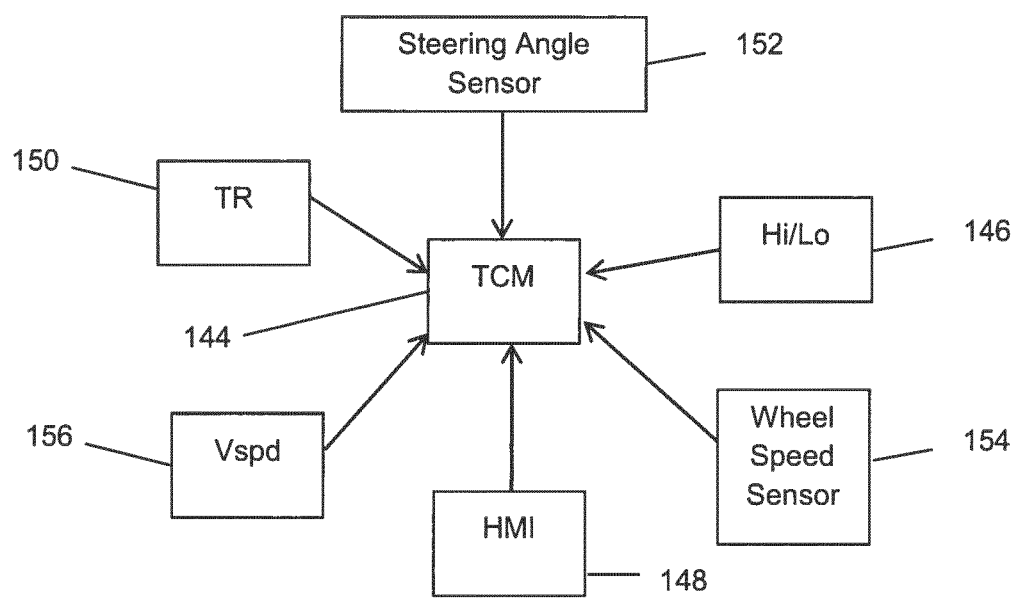
FIG. 8 is an interface diagram for a vehicle including the vehicle steering assembly of FIG. 2.

The gearshift system 142 is controlled by the transmission controller 144, which is responsible for determining when gear changes should be made and for conducting gear changes automatically. The transmission controller 144 incorporates a gear selector, such as a lever, knob or rotary control (not shown), which allows the driver to select a main operating mode such as "drive" or "sport". As shown in FIG. 8, the transmission controller 144 receives input data from each of the other components of the gearshift system 142, along with the steering angle sensor 152, the wheel speed sensor 154, and the braking system controller 156. In addition, the transmission controller 144 also receives gearshift request signals generated when either of the paddles 116 is pulled by the driver. The transmission controller 144 uses the input data in order to determine when gear changes should be made. The transmission controller 144 also determines from the input data whether the paddles 116 should be in the deployed state or the retracted state.

The transfer box controller 146 includes a switch that enables the driver to select either a high gear range or a low gear range mode, selectable by the driver. The low gear range mode is used when improved tractability is required, for example if the vehicle 140 is towing a large load or driving over rough terrain. The driver selection is sent by the transfer box controller 146 as input data to the transmission controller 144.

The HMI 148 is typically located on a dashboard of the vehicle 140, and allows the driver to select preferences for how the vehicle 140 should be configured, including preferences for transmission behavior. Additionally, the driver can use the HMI 148 to input data relating to other aspects of the vehicle which are not related to the transmission. The configuration that is created by the user through the HMI 148 is sent to the transmission controller 144 in order to help determine when gear changes should be made, and whether manual gear selection mode is to be automatically enabled under certain circumstances. In addition, the data that is input into the HMI 148 is used to configure other control modules of the vehicle 140 which are responsible for implementing certain types of control.

The terrain mode controller 150 includes a switch that enables the driver to select the type of terrain that the vehicle 140 is driving over. Once a terrain has been selected, the terrain mode controller instructs the transmission controller 144 of the type of terrain that the driver has selected. The transmission controller 144 then makes gear changes according to a control regime that is related to the selected terrain. This option is more advanced than high/low gear range modes described above, and optimizes the transmission for several different types of terrain with subtle differences in control associated with each. The terrain mode controller 150 also influences other aspects of vehicle control, for example throttle mapping, braking assistance and distribution, traction control and suspension behavior.

The steering angle sensor 152 forms part of a steering module which is associated with the steering assembly 110. The steering angle sensor 152 detects the angle at which the steering wheel 112 is positioned, and sends a signal to the transmission controller 144 to indicate the angle. Multiple measurements of the steering wheel angle can be made in order to determine a rate of change of the steering wheel angle.

The wheel speed sensor 154 detects the current rotational speed of a vehicle wheel 158, which is indicative of the vehicle speed. There may be multiple wheel speed sensors 154 provided on the vehicle 140, each monitoring a different wheel 158 for improved accuracy. The detected wheel speed is sent as input data to the transmission controller 144.

The braking system controller 156 is used to control the brakes of the vehicle for a range of purposes. For example, the braking system controller 156 may be used to implement an anti-lock braking system so as to prevent locking of the wheels of the vehicle under braking. Other systems that the braking system controller 156 may be used for include electronic brake-force distribution, traction control systems and electronic stability control systems. The braking system controller 156 includes means for determining the rotational speed of each wheel of the vehicle. The detected wheel speeds can be used to determine whether the vehicle 140 is turning or performing a maneuver, therefore providing an alternative or complimentary method to using the steering angle sensor 152 to determine whether the vehicle is turning.

As described above, the transmission controller 144 is arranged to cause deployment or retraction of the paddles 116. A basic level of control of the paddle position can be achieved for example through settings in the HMI 148 which allow the driver to select whether the paddles 116 should be kept in the deployed state or the retracted state at all times.

A more sophisticated level of control can also be provided, in which the transmission controller 144 is configured to deploy or retract the paddles in response to specific driver inputs during operation of the vehicle.

For example, in one embodiment, the transmission controller 144 is configured to trigger retraction or deployment of the paddles 116 in response to specific driver inputs to the paddles 116 themselves. When the paddles 116 are in the deployed state, the driver can retract them manually by pulling both paddles 116 simultaneously. In this scenario, the transmission controller 144 receives a gear change request signal from both paddles 116, indicating that both paddles 116 are being pulled. The transmission controller 144 treats this as a request to retract the paddles 116. Accordingly, the transmission controller 144 then assumes control of the paddles 116 and completes the retraction by driving the deployment/retraction mechanism 120. At the same time, the transmission controller 144 switches the transmission into automatic gear selection mode.

When in the retracted state, the driver can manually deploy the paddles 116 by pressing either one of them. Since it is assumed that the driver will not accidentally press the paddles 116 when they are retracted, when the transmission controller 144 receives a gear change request signal from a retracted paddle 116, the transmission controller 144 deploys the paddles 116. It is noted that, in this embodiment, pressing a retracted paddle 116 does not effect a manual gear change, and in this sense the paddles 116 are disabled for gearshift control when in the retracted state.

Alternatively, or in addition, a dedicated switch can be provided on the dashboard which enables the driver to control whether the paddles 116 are deployed or retracted.

The transmission controller 144 can also trigger deployment or retraction of the paddles without direct driver input, in response to changes in the operating conditions of the vehicle. For example, it is desirable for the paddles 116 to be moved into the retracted state when there is a danger of inadvertent triggering of manual mode. It is also useful that the option to use manual mode is available to the driver when manual control is likely to be needed or desired.

Several scenarios in which the paddles 116 may be automatically deployed or retracted by the transmission controller 144 are outlined below, along with the input data that the transmission controller 144 uses to determine whether the paddles 116 should be deployed or retracted in each case.

Firstly, if an "off-road" type terrain is selected with the terrain mode controller 150, the paddles 116 are moved into the deployed state, as it is desirable for the driver to have immediate access to manual gear selection for enhanced control over the vehicle 140 when driving off-road. If an on-road terrain is selected, the transmission controller 144 will not deploy the paddles 116 automatically.

If the output from the transfer box controller 146 indicates that the vehicle 140 is in a low range gear mode, this indicates that a higher degree of control over the vehicle 140 may be desired. This may be because the vehicle 140 is towing a high load, or is driving over rough terrain. Accordingly, the paddles 116 are automatically deployed in the event that the vehicle 140 is in low range gear mode.

If the wheel speed sensor 154 indicates that the vehicle 140 is moving below a pre-determined speed threshold, the paddles 116 are automatically retracted. This is because slow movement may indicate that the driver is performing a maneuver such as parking, which as noted previously is a particularly problematic time for inadvertent triggering of manual gear selection mode. If manual mode is triggered inadvertently during a parking maneuver without the driver realizing, the driver may not understand why the vehicle 140 stops changing gear automatically. By automatically moving the paddles 116 into the retracted state, this situation can be avoided.

In a related scenario, the transmission controller 144 can be configured to automatically retract the paddles 116 at any time that the vehicle 140 is in a low gear. For example, the paddles 116 may only be deployed if the vehicle 140 is in third gear or higher, as the driver is unlikely to need manual control when in first or second gear. Similarly, the transmission controller 144 can be configured to automatically retract the paddles 116 in the event that a reverse gear is selected.

If the steering angle sensor 152 indicates a large steering wheel angle, for example above a threshold of 80°, the transmission controller 144 automatically moves the paddles 116 into their retracted state. By doing this, the possibility of a paddle 116 coming into contact with the driver's legs or clothing can be avoided. Some vehicles incorporate systems in which the steering response is dependent on the vehicle speed, with the steering wheel 112 being more sensitive at lower vehicle speeds. Accordingly, the steering wheel angle threshold at which the paddles 116 are retracted can be made dependent on the instantaneous vehicle speed as indicated by the wheel speed sensor 154.

It is also conceivable that the functionality of the paddles 116 could be swapped when the steering wheel angle exceeds 90°. In this way, as the steering wheel 112 is turned, the function assigned to each paddle 116 changes so that, for example, the paddle 116 positioned to the left of the steering column housing always provides a downshift and the paddle 116 positioned to the right of the steering column housing always provides an upshift, even though the paddles 116 themselves may have physically swapped sides.

As noted above, the steering angle sensor 152 can be used to measure the rate of change of the steering wheel angle. If the rate of change is high, this indicates that the driver is turning quickly. Under such conditions, the transmission controller 144 automatically retracts the paddles 116. It is unlikely that the driver will want to make a manual gear change whilst operating the steering wheel 112 rapidly, whereas the possibility of inadvertently triggering manual mode is relatively high in this scenario. A further consideration is that it may be difficult for the driver to operate the paddles correctly when the steering wheel angle is high, because the paddles 116 are significantly displaced from their initial position. Therefore, it may not be obvious which paddle 116 shifts up a gear and which paddle 116 shifts down a gear.

In one embodiment of the invention manual gear selection mode only remains active for a specified period if no manual gear selection inputs are received; once that period has elapsed, automatic gear selection is resumed. In the vehicle steering assembly 110 of this embodiment, the paddles 116 can be arranged to move into the retracted state after a period of non-usage, for example five minutes. Timed retraction can be a user-selectable option, which can be customized through the HMI 148, including the period to wait prior to automatic retraction.

The transmission controller 144 can also be configured such that the paddles 116 are automatically retracted or deployed in certain driving modes. For example, the paddles 116 may be deployed when the vehicle 140 is in "sport" mode, in which the vehicle 140 is set up for enhanced driver involvement. Conversely, the paddles 116 may be retracted when the vehicle 140 is in "drive" mode, in which a more passive driving experience is desired. These options can be customized by the driver through the HMI 148. The HMI 148 also offers the driver the option to override the default settings for terrain modes and low range gear mode, so that, for example, the paddles 116 are automatically retracted when driving off-road.

While the control strategies outlined above may be implemented as default settings for the gearshift system 142, in this embodiment the driver is offered full customization of all these scenarios through the HMI 148. Accordingly, the driver is able to configure the deployment and retraction of the paddles 116 to suit their preferences. For example, if the driver would prefer not to have the paddles 116 deployed when an off-road terrain mode is selected, this can be specified in the HMI 148.

Figure 9:
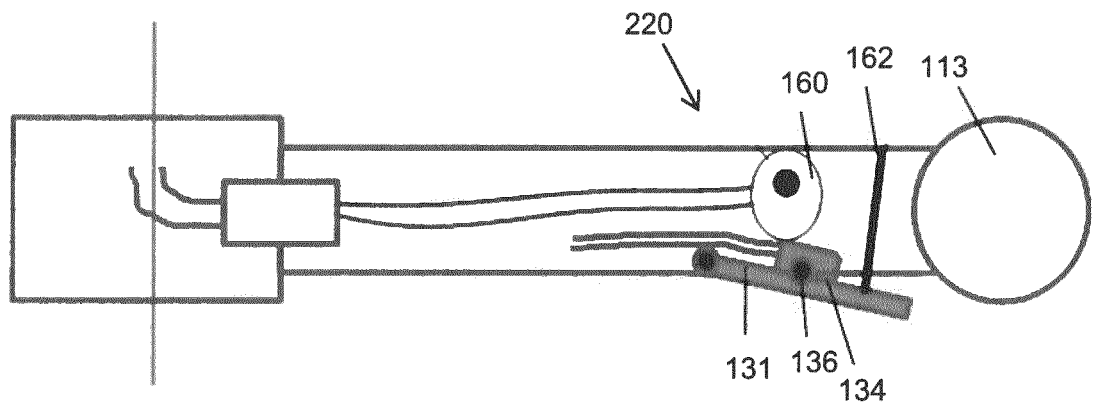
FIG. 9 is a schematic cross-sectional view of part of the vehicle steering assembly of FIGS. 2 to 4 with a carrier of the gearshift paddles in a deployed state.
Figure 10:
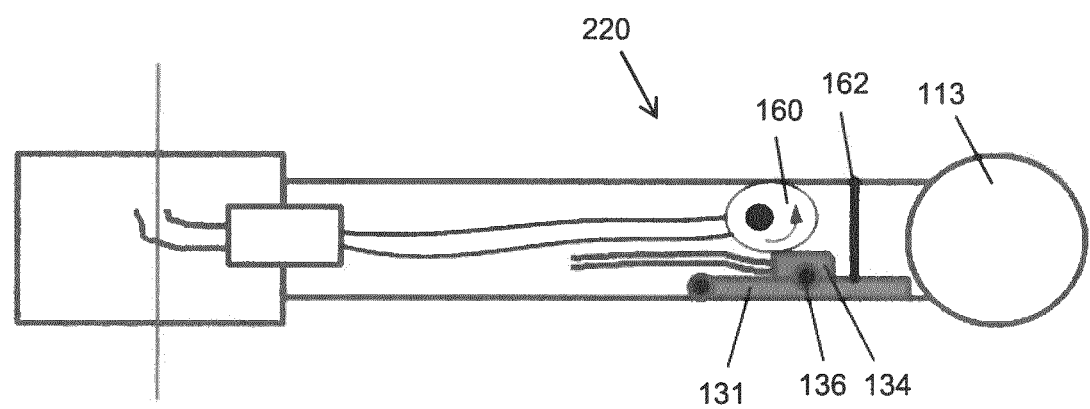
FIG. 10 is a schematic cross-sectional view of part of the vehicle steering assembly of FIGS. 2 to 4 with the carrier in a retracted state.

FIGS. 9 and 10 show simplified cross-sectional views of the steering wheel 112 with an alternative paddle deployment and retraction mechanism 220 to that shown in FIGS. 5 and 6. In FIGS. 9 and 10, the paddle is omitted for clarity. However, it should be appreciated that in this embodiment the way the paddle is arranged with respect to the carrier 131 and the microswitch 134 is the same as the arrangement shown in the embodiment of in FIGS. 5 and 6. Therefore, the paddle is mounted at the paddle pivot 136, about which the paddle pivots when pulled so as to actuate a lever of the microswitch 134 in order to generate a gear change request signal.

In this embodiment, the carrier 131 is moved by means of a cam 160 so as to move the paddle between the retracted position and the deployed position. The cam 160 is driven by an integral stepper motor, which is not visible in the figure. A spring 162 is provided to bias the carrier 131 towards the retracted position, which ensures the carrier 131 remains in contact with the cam 160. As the cam 160 rotates, its eccentricity causes the carrier 131 to pivot and move between the retracted and the deployed positions. FIG. 9 shows the deployed position, and FIG. 10 shows the retracted position.

The skilled reader will appreciate that many further alternative mechanisms could be employed for the purpose of moving the paddle 116 between the deployed position and the retracted position. As a further non-limiting example, a damped solenoid could be used in the place of a motor for effecting motion of the paddle 116.

In a variant of the vehicle steering assembly, the paddles are mounted on a steering column housing rather than on the steering wheel. In this case, the paddles may retract away from the driver, into recesses on the steering column housing.

In an embodiment, the paddles are arranged to continue functioning as manual gear selectors when in the retracted state. In this embodiment, the likelihood of inadvertent triggering of the manual mode is still reduced by virtue of the retraction of the paddles, but the option remains open for the user to make manual gear selections at any time if desired.

In another embodiment, retractable buttons are used in the place of paddles. Similarly, in a further embodiment, contact pads are used as control members.

It will be appreciated by the skilled reader that many different types of mechanism are possible for achieving the effect of moving the paddles between the deployed and retracted states.

It will be appreciated by a person skilled in the art that the invention could be modified to take many alternative forms to that described herein, without departing from the scope of the appended claims.

The invention claimed is:

1. An input device for use in a vehicle steering assembly, the input device comprising a first user-operable control member and a second user-operable control member, each control member being moveable between a deployed state and a retracted state, and a respective switch for each control member wherein each switch is operable by its respective control member;

wherein each control member, when in its deployed state, is operable to provide an input to a vehicle control system;

and wherein simultaneous user operation of the first and second control members actuates the respective switches causing each switch to generate a respective electrical signal, and wherein movement of the first and second control members from their deployed states into their retracted states is triggered in response to both of the respective electrical signals.

2. The input device according to claim 1, wherein the control members are operable, in use, to output a gearshift request signal for a vehicle transmission system.

3. The input device according to claim 1, comprising a positioner configured to move each control member between its deployed state and its retracted state.

4. The input device according to claim 3, wherein the positioner comprises an electric motor.

5. The input device according to claim 4, comprising a respective screw for each control member, wherein the electric motor is operable to effect rotation of the screws, and wherein rotation of the screws causes each control member to move between its retracted state and its deployed state.

6. The input device according to claim 1, wherein each switch is operable by its respective control member when in the retracted state.

7. The input device according to claim 1, wherein each control member comprises a lever.

8. A vehicle steering assembly, comprising a steering wheel and an input device according to claim 1.

9. The vehicle steering assembly according to claim 8, wherein the control member is mounted to the steering wheel.

10. The vehicle steering assembly according to claim 9, wherein the control member is pivotally mounted to the steering wheel at a pivot, and wherein a free end of the control member is disposed towards a rim of the steering wheel and remote from the pivot, optionally wherein, when in its retracted state, the free end of the control member is closer to the steering wheel than when the control member is in its deployed state, and optionally wherein, when in its retracted state, the control member is stowed in a recess provided in the steering wheel.

11. The vehicle steering assembly according to claim 10, wherein, when in its deployed state, the free end of the control member is positioned with respect to the rim of the steering wheel such that the control member can be operated by a user with one hand whilst simultaneously gripping the steering wheel with the same hand.

12. A transmission for a vehicle, comprising a transmission controller and an input device according to claim 1, wherein each control member of the input device is operable to provide a gearshift request input to the transmission controller.

13. The transmission according to claim 12, wherein, when each control member is in its retracted state, the transmission controller is arranged to ignore gearshift request inputs sent by the control members, optionally wherein movement of the control members between the deployed and retracted states is controlled by the transmission controller.

14. The transmission according to claim 12, wherein the first control member is operable to send an upshift request to the transmission controller, and the second controller is operable to send a downshift request to the transmission controller.

15. A vehicle comprising an input device according to claim 1.

16. A method for operating an input device for a vehicle transmission, the input device comprising a first control member, a second control member, and a respective switch for each control member, the first and second control members and switches being associated with a vehicle steering assembly, the method comprising detecting a user request for retraction of the control members, and moving each control member in response to the user request into a respective retracted state;

wherein the user request for retraction comprises simultaneous user operation of the first and second control members which actuates the respective switches causing each switch to generate a respective electrical signal, and wherein movement of the first and second control members into the respective retracted state is triggered in response to both of the respective electrical signals.

17. The method according to claim 16, comprising monitoring an operating parameter of the vehicle, and moving the control members into their retracted states or their deployed states in dependence on the operating parameter.

18. The method according to claim 17, wherein the operating parameter is at least one of:

a vehicle speed, wherein the method comprises moving each control member into its retracted state if the vehicle speed is below a speed threshold;

a steering wheel angle, wherein the method comprises moving each control member into its retracted state if the steering wheel angle is above an angle threshold;

a rate of change of steering wheel angle, wherein the method comprises moving each control member into its retracted state if the rate of change is above a rate threshold;

a terrain mode, wherein the method comprises moving each control member into its deployed state if the vehicle is in an off-road driving mode;

a vehicle gear, wherein the method comprises moving each control member into its retracted state if the vehicle is operating in a pre-determined low range gear; and a vehicle drive mode, and wherein the method comprises moving each control member into its retracted state if the vehicle is operating in a pre-determined drive mode.

19. The method according to claim 17, comprising moving each control member into its retracted state if the control members are not operated for a pre-determined time period.

* * * * *